United States Patent
Santín Navarro et al.

(10) Patent No.: US 11,535,187 B2
(45) Date of Patent: Dec. 27, 2022

(54) AIRBAG MODULE AND METHOD OF MANUFACTURING SAID AIRBAG MODULE

(71) Applicant: DALPHI METAL ESPANA S.A., Vigo (ES)

(72) Inventors: Pedro Jose Santín Navarro, Vigo (ES); Miguel Sobradelo Sineiro, Sisan-Ribadumia (ES)

(73) Assignee: Dalphi Metal Espana, S.A., Vigo (ES)

( * ) Notice: Subject to any disclaimer, the term of this patent is extended or adjusted under 35 U.S.C. 154(b) by 0 days.

(21) Appl. No.: 17/288,714

(22) PCT Filed: Nov. 28, 2019

(86) PCT No.: PCT/EP2019/082900
§ 371 (c)(1),
(2) Date: Apr. 26, 2021

(87) PCT Pub. No.: WO2020/109463
PCT Pub. Date: Jun. 4, 2020

(65) Prior Publication Data
US 2021/0402947 A1    Dec. 30, 2021

(30) Foreign Application Priority Data
Nov. 29, 2018  (DE) .......................... 102018009358.2

(51) Int. Cl.
*B60R 21/237*    (2006.01)
*B60R 21/201*    (2011.01)
(Continued)

(52) U.S. Cl.
CPC .......... *B60R 21/237* (2013.01); *B60R 21/201* (2013.01); *B60R 21/213* (2013.01); *B60R 21/232* (2013.01)

(58) Field of Classification Search
CPC ... B60R 21/201; B60R 21/213; B60R 21/232; B60R 21/237
See application file for complete search history.

(56) References Cited

U.S. PATENT DOCUMENTS 7,163,232 B2 *  1/2007  Yokoyama ............ B60R 21/201
                                                    280/730.2
7,806,433 B2 * 10/2010  Mitsuo ................ B60R 13/0225
                                                    280/730.2
(Continued)

FOREIGN PATENT DOCUMENTS

DE        10248532 A1     4/2004
DE    112004000671 T5     4/2006
(Continued)

OTHER PUBLICATIONS

International Search Report and Written Opinion for PCT/EP2019/082900 dated Feb. 24, 2020 (12 pages; with English translation).

*Primary Examiner* — Laura Freedman
(74) *Attorney, Agent, or Firm* — Kristin L. Murphy

(57) ABSTRACT

The disclosure relates to an airbag module that comprises an inflatable airbag, an inflator for inflating the airbag and a plurality of securing units for attaching the airbag module to a vehicle. The airbag has a C-shaped configuration including two juxtaposed legs in an imaginary cross-sectional plane that is transverse to its longitudinal extension. The disclosed design of the airbag is configured to improve deployment behavior such that in a mounting situation of the airbag 10 a central plane defined between the two legs intersects a vertical plane extending through the longitudinal extension of the airbag. A manufacturing method for an airbag module is disclosed.

13 Claims, 5 Drawing Sheets

(51) Int. Cl.
    *B60R 21/213*    (2011.01)
    *B60R 21/232*    (2011.01)

(56) References Cited

U.S. PATENT DOCUMENTS

| | | | |
|---|---|---|---|
| 7,823,914 B2* | 11/2010 | Cheal | B60R 21/213 |
| | | | 280/730.2 |
| 8,308,192 B2* | 11/2012 | Konishi | B60R 21/213 |
| | | | 280/730.2 |
| 8,540,279 B2* | 9/2013 | Jun | B60R 21/232 |
| | | | 280/730.2 |
| 8,955,875 B2* | 2/2015 | Maita | B60R 21/23138 |
| | | | 280/730.2 |
| 9,145,103 B2* | 9/2015 | Kashio | B60R 21/231 |
| 9,896,057 B2* | 2/2018 | Fischer | B60R 21/23138 |
| 2004/0164530 A1 | 8/2004 | Sunabashiri | |
| 2007/0052225 A1* | 3/2007 | Borje | B60R 21/237 |
| | | | 280/743.1 |
| 2007/0075530 A1 | 4/2007 | Yokoyama | |
| 2013/0087999 A1* | 4/2013 | Konishi | B60R 21/201 |
| | | | 280/743.1 |
| 2014/0054879 A1 | 2/2014 | Taguchi et al. | |
| 2018/0208146 A1 | 7/2018 | Azuma et al. | |

FOREIGN PATENT DOCUMENTS

| | | |
|---|---|---|
| DE | 102013011154 A1 | 1/2015 |
| JP | 2011178208 A * | 9/2011 |
| JP | 2018127139 A * | 8/2018 |
| KR | 20140084977 A | 7/2014 |

\* cited by examiner

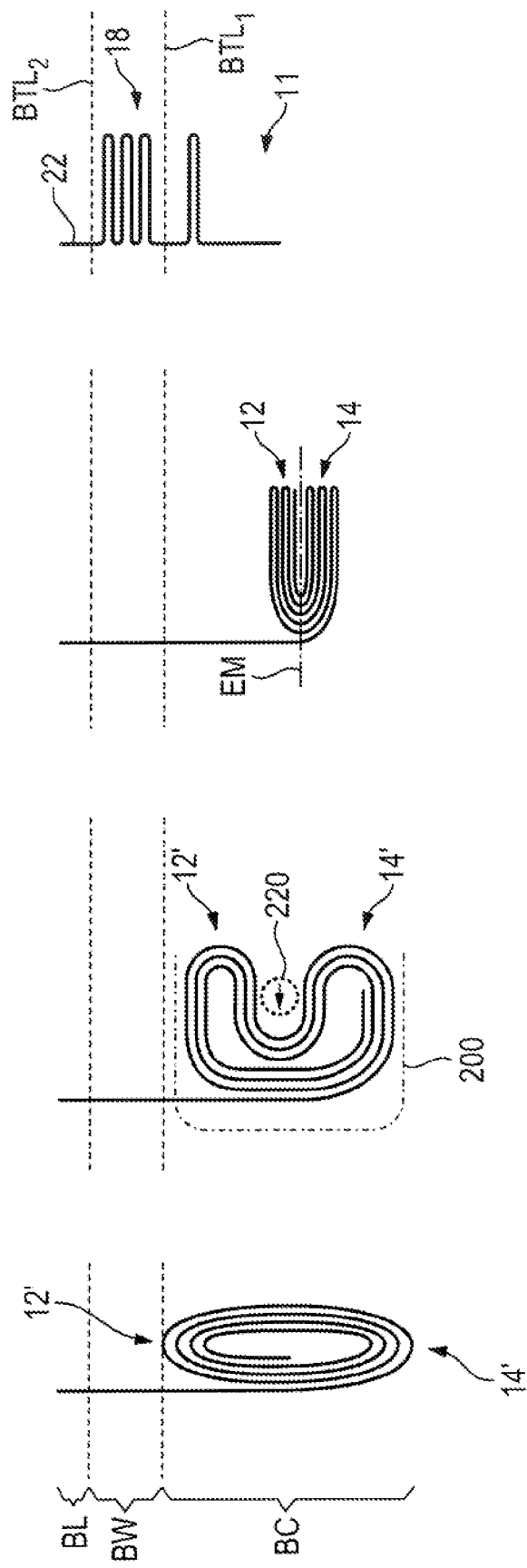

AIRBAG MODULE AND METHOD OF MANUFACTURING SAID AIRBAG MODULE

CROSS-REFERENCE TO RELATED APPLICATIONS

This application is a national stage of International Application No. PCT/EP2019/082900, filed Nov. 29, 2019, the disclosure of which is incorporated herein by reference in its entirety, and which claimed priority to German Patent Application No. 102018009358.2, filed Nov. 29, 2018, the disclosure of which is incorporated herein by reference in its entirety.

TECHNICAL FIELD

The disclosure relates to an airbag module as well as to a method of manufacturing an airbag module.

BACKGROUND

For improving occupant protection and pedestrian protection, restraint devices comprising inflatable airbags are used in many vehicles, especially in automotive land vehicles. Said airbag modules are configured for single occupants or for plural occupants to mitigate forces which act or threaten to act, usually from outside of the vehicle, upon the interior of the automotive vehicle. Depending on the direction of impact, a distinction is made between frontal impact protection devices (e.g. driver airbag module, passenger airbag module, knee airbag module), side impact protection devices (e.g. thorax airbag module, curtain airbag module) and rear impact protection devices. In addition, other airbag modules may be applied in the vehicle interior (e.g. interactive airbag module, backseat occupant module, inflatable seat belt) as well as inflatable impact protection devices disposed outside the vehicle interior. The disclosure relates to all the afore-mentioned airbags.

In WO 2004/0941198 A1 it is described, for example, to initially roll up an airbag intended for a curtain airbag module so far that only the securing straps are protruding and then to invert the roll by means of a round bar or a plate in parallel to a direction of the securing straps so as to obtain an upwardly open C-shaped form which is then fixed by a wrapping.

A curtain airbag module comprising an airbag prepared in this way is less suited for certain vehicles, however, as the upwardly directed inversion may inadvertently influence the deployment behavior in the case of release.

Therefore, what is needed is an airbag module having an improved deployment behavior. In addition, a method of manufacturing said airbag module is also needed.

SUMMARY

An airbag module comprising an inflatable airbag, an inflator for inflating the airbag and comprising a plurality of securing units for attaching the airbag module to a vehicle is disclosed. In one exemplary arrangement, an airbag having a C-shaped configuration is disclosed, comprising two juxtaposed legs in an imaginary cross-sectional plane transversely to a longitudinal extension.

In accordance with an exemplary arrangement, the airbag module is designed so that in a mounting situation of the airbag a central plane defined between the two legs intersects a vertical plane extending through the longitudinal extension of the airbag.

As the airbag is designed so that the orientation of the C-shaped configuration is arranged laterally inwardly or outwardly, horizontally or diagonally, the primary inflating behavior, in particular the initial and the primary spreading direction of the airbag can be adapted to the vehicle-specific requirements.

According to a further exemplary arrangement, the airbag module is designed so that along its longitudinal extension the inflatable airbag has a plurality of cross-sectional planes parallel to each other, wherein a first central plane defined by the legs juxtaposed in a first cross-sectional plane intersects a second central plane defined by the legs juxtaposed in a second cross-sectional plane.

Thus the airbag is configured so that the orientation of the C-shaped configuration is different at different points along its longitudinal extension (arranged laterally inwardly or outwardly, upwardly or downwardly, horizontally, vertically or diagonally). In this manner, the primary inflating behavior, especially the initial and the primary spreading direction of the airbag may be adapted to the vehicle-specific requirements. For example, an open side of the C-shaped configuration may point at the front end of the airbag toward the car body, while a central portion may point e.g. inwardly (away from the car body) and a rear area may point diagonally outwardly and diagonally downwardly. According to one exemplary arrangement, the individual inflating behavior may thus be differently designed via the length of the airbag.

According to another exemplary arrangement, the airbag module is designed so that another portion of the airbag is arranged adjacent to at least one of the juxtaposed legs and/or to a portion of the C-shaped configuration connecting said legs.

As the airbag is configured so that, in addition to the C-shaped area of the airbag, a further and possibly also differently configured area is provided. Thus, a secondary inflating behavior, especially the later spreading direction of the airbag during inflation may be adapted to the vehicle-specific requirements.

According to an exemplary arrangement, the airbag is rolled and/or zigzag folded in the direction of its longitudinal extension within its C-shaped configuration.

Also, in one exemplary arrangement, the airbag is rolled and/or zigzag folded in the direction of its longitudinal extension in an area of its further portion. This arrangement helps to further adapt and, resp., improve the inflation behavior to particular vehicle conditions.

According to another exemplary arrangement, along its longitudinal extension the airbag includes a plurality of securing straps for receiving securing units for attaching the airbag to a vehicle. Accordingly, the airbag is may be designed so that, in a mounting situation of the airbag, the securing straps are arranged substantially in parallel to a vertical plane. In accordance with one exemplary arrangement, the securing straps may extend from the first leg of the juxtaposed legs.

Alternatively, the securing straps may extend from the connecting portion.

In a further alternative, the securing straps may extend from a further portion.

Also, by each of said features the inflation behavior can be further adapted and, resp., improved to the particular vehicle conditions.

In accordance with a one exemplary arrangement, the airbag is provided to include a plurality of longitudinal portions along its longitudinal extension and to be disposed in the airbag module such that a first open side of a first C-shaped configuration can be or is positioned in a first longitudinal portion, especially in a mounting situation of the airbag, so that it points to a direction other than a different open side of different C-shaped configuration in a different longitudinal portion of the airbag.

Depending on the intended purpose of use and protection, each of the exemplary arrangements, may be one of the following airbag modules: a frontal impact protection device, such as one of a driver airbag module, passenger airbag module or knee airbag module; side impact protection device, such as a thorax airbag module or a curtain airbag module; a rear impact protection device, an interacting airbag module, a diagonal impact module, a backseat occupant module, an inflatable seat belt, and/or an inflatable external impact protection device.

In each of the exemplary arrangements, the airbag may further include, along its longitudinal extension, a plurality of strip-shaped retaining elements that are spaced apart from each other and annularly surround the airbag to maintain the airbag in mounting configuration on the vehicle.

Basically, with each of the described embodiments it is noted that the C-shaped configuration, especially in connection with the strip-shaped retaining elements, e.g. annular adhesive strips, reduces the tendency of the airbag to rotate or to be rotated about its longitudinal extension by up to 50%. Moreover, in the case of such rotation the airbag tends to return to the original position; therefore, additional anti-rotation means, e.g. "anti-twist straps" are dispensable.

Thus, another aspect of the disclosure is the use of an airbag of C-shaped configuration having two juxtaposed legs of airbag material to provide an airbag module having increased resistance to rotation.

Accordingly, an airbag module according one exemplary arrangement, includes an inflatable airbag, an inflator for inflating the airbag and a plurality of securing units to attach the airbag module to a vehicle, wherein, in an imaginary cross-sectional plane transversely to its longitudinal extension, the airbag has a C-shaped configuration including two juxtaposed legs which may be fixed by strip-shaped retaining elements.

The use of such an airbag module as described above renders the assembly of the airbag module within the vehicle body safer as inadvertent twisting of the airbag during assembly is reduced.

A method of manufacturing an airbag module, especially an airbag module of the afore-described type, is also disclosed. More specifically, a method in which an airbag is rolled and/or folded, especially transversely to its longitudinal extension, to form an elongate package is disclosed. In a further step, lateral edges of the package are moved toward each other at least in portions and may be fixed.

The airbag is thus configured so that, in an imaginary cross-sectional plane that is transverse to its longitudinal extension, it has a C-shaped configuration including two juxtaposed legs.

In another step, the airbag is disposed and aligned relative to an inflator of the airbag module so that in a mounting situation of the airbag a central plane defined between the two legs intersects a vertical plane extending through the longitudinal extension of the airbag.

According to another exemplary method of manufacturing an airbag module, especially an airbag module of the afore-described type in which an airbag is rolled and/or folded especially transversely to its longitudinal extension to form an elongate package, and in which then lateral edges of the package at least in portions are moved toward each other and are fixed so that, in an imaginary cross-sectional plane transverse to its longitudinal extension, the airbag has a C-shaped configuration including two juxtaposed legs, wherein the inflatable airbag includes a plurality of cross-sectional planes parallel to each other along its longitudinal extension and wherein a first central plane defined by the legs juxtaposed in a first cross-sectional plane intersects a second central plane defined by the legs juxtaposed in a second cross-sectional plane.

Finally, according to another exemplary method of manufacturing an airbag module, especially an airbag module of the afore-described type in which an airbag is rolled and/or folded, especially transversely to its longitudinal extension, to form an elongate package, and in which then lateral edges of the package at least in portions are moved toward each other and are fixed so that, in an imaginary cross-sectional plane transverse to its longitudinal extension, the airbag has a C-shaped configuration including two juxtaposed legs.

In a separate step, adjacent to at least one of the juxtaposed legs and/or to a portion of the C-shaped configuration connecting said legs, another portion of the airbag is arranged.

The portion of the airbag may be rolled and/or zigzag folded separately from the C-shaped configuration of the airbag.

As regards the afore-described exemplary methods, the following steps may be provided in which:
the airbag is rolled and/or zigzag folded in the direction of its longitudinal extension within its C-shaped configuration and/or the airbag is rolled and/or zigzag folded in the direction of its longitudinal extension in the area of its further portion.

In accordance with another exemplary step, an airbag cutting including, along its longitudinal extension, a plurality of securing straps for receiving securing units to attach the airbag module to a vehicle is used. As an alternative, said securing straps may also be arranged later on the airbag cutting.

In accordance with another exemplary arrangement, the airbag is configured so that the securing straps are arranged in a mounting situation of the airbag substantially in parallel to the vertical plane.

According to a different exemplary step, the airbag is designed so that the securing straps extend from the first leg. Alternatively, the securing straps may extend from the connecting portion. In yet another alternative, the securing straps may extend from the further portion.

According to an exemplary arrangement of the method, the airbag is provided to be shaped, especially rolled and/or folded so that it has a plurality of longitudinal portions along its longitudinal extension and is arranged in the airbag module such that a first open side of a first C-shaped configuration can be or is positioned in a first longitudinal portion, such as in a mounting situation of the airbag so that the airbag points to a direction other than a different open side of a different C-shaped configuration in a different longitudinal portion of the airbag.

In another exemplary arrangement, the airbag is provided, along its longitudinal extension, with a plurality of especially strip-shaped retaining elements being spaced apart from each other and annularly surrounding the airbag which are configured to maintain the airbag in its configuration provided for mounting on the automotive vehicle. Alternatively, the airbag and, resp., substantial areas thereof may also be surrounded by a mounting tube.

BRIEF DESCRIPTION OF THE DRAWINGS

Hereinafter, the disclosure shall be illustrated in further detail by way of exemplary embodiments with reference to the enclosed drawings, wherein:

FIGS. 5a-e show views of individual steps of an exemplary manufacturing method.

DETAILED DESCRIPTION

Figure 1:
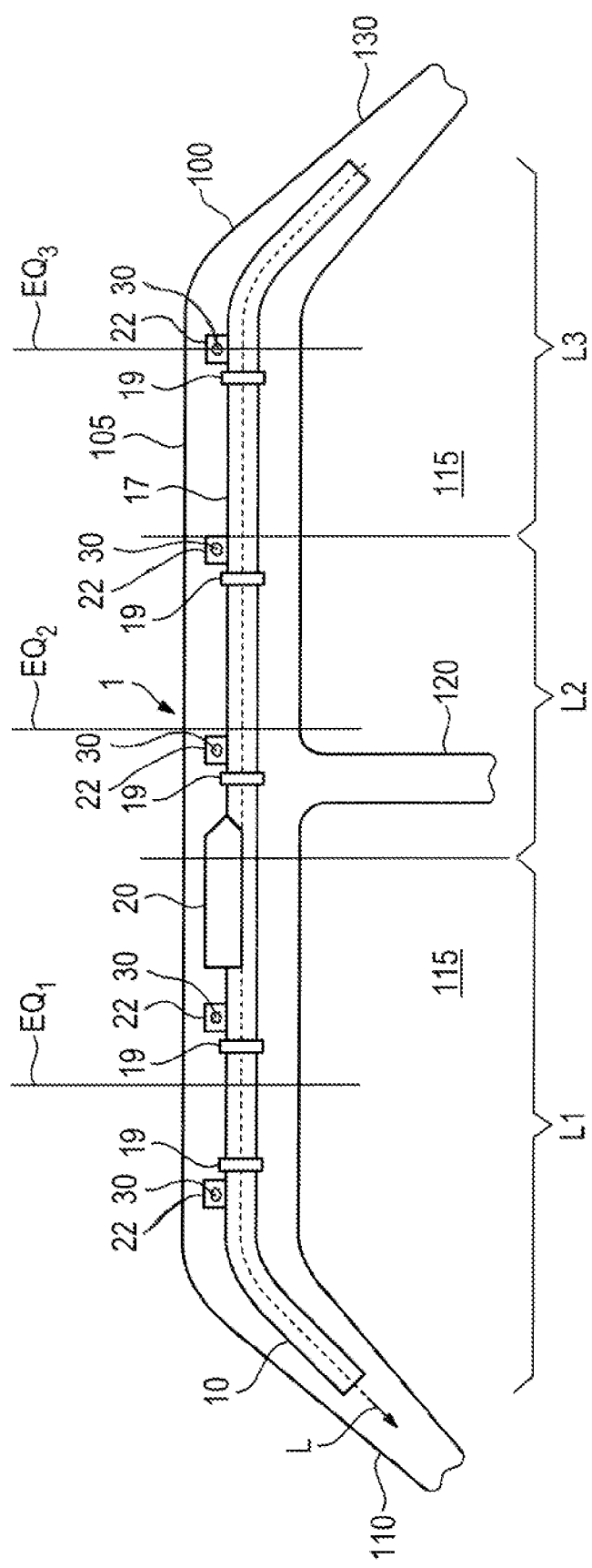
FIG. 1 shows a side view of a first exemplary arrangement of an airbag module.

Even though the invention is applicable to all aforedescribed types of airbags and, resp., airbag modules, for better comprehension it will hereinafter be illustrated by way of a curtain airbag module:

In FIG. 1 a side view of a first exemplary arrangement of an airbag module 1 according to the disclosure is shown by an example of a curtain airbag module in a mounting situation in a vehicle body 100. The airbag module 1 comprises an inflatable airbag 10, an inflator 20 for inflating the airbag 10 and a plurality of securing units 30 for attaching the airbag 10 to an inner face of a vehicle, in this case at a roof rail 105 above side windows 115. In the arrangement illustrated in FIG. 1, the airbag module 1 extends from the A pillar 110 via the B pillar 120 to the C (or D) pillar 130.

Figure 2:
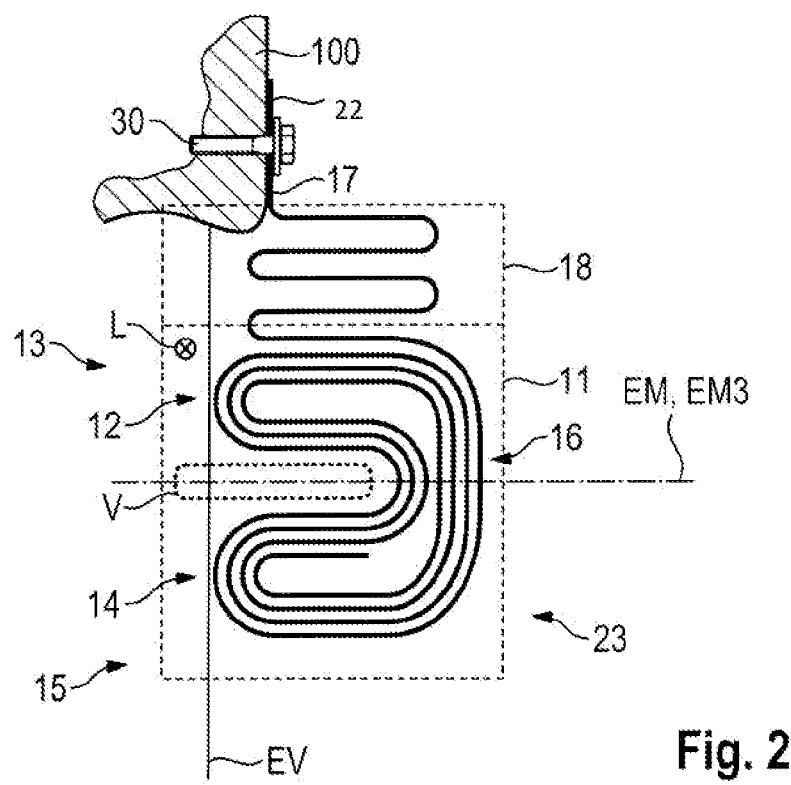
FIG. 2 shows a cross-sectional view of the airbag module shown in FIG. 1 in a first configuration variant.

FIG. 2 illustrates a sectional view across the airbag module 1 in its mounting situation (mounted in the idle condition before activation or, resp., in the condition of being mounted into the vehicle) in an imaginary cross-sectional plane EQ3 that extends transverse to a longitudinal extension L of the airbag 10, shown in broken lines in FIG. 1. As shown in FIG. 2, the airbag 10 has a C-shaped configuration 11 including two juxtaposed legs 12, 14. By the term "configuration" a "rolled" folding or a "zigzag" folding or a combination of said folding variants is contemplated. For obtaining a C-shaped configuration 11, the rolled-up or zigzag-folded (collectively, "rolled-folded") portion of an airbag blank sewn together from airbag cuttings or one-piece woven (OPW) is impressed from one side by a rod- or plate-shaped device V (indicated in dotted lines in FIG. 2). In this manner, two legs 12, 14 are formed from the airbag blank folded in this way, said legs 12, 14 then being laid adjacent to or on top of each other so that the legs 12, 14 point to the same direction. The side of the C-shaped configuration on which free ends of the legs 12, 14 are located is referred to as "open side" 13. The part of the C-shaped configuration 11 being opposed to the open side and connecting the two legs 12, 14 is referred to as connecting portion 16. Between the two legs 12, 14 a central plane EM is defined. According to a first exemplary embodiment of the disclosure, the central plane EM intersects a vertical plane EV that extends through the longitudinal extension L of the airbag 10 in the cross-sectional plane EQ (EQ3) shown in FIG. 2. In one exemplary arrangement, the C-shaped configuration 11 comprises at least three (as shown in FIG. 3), or more complete windings of the airbag blank.

Figure 3:
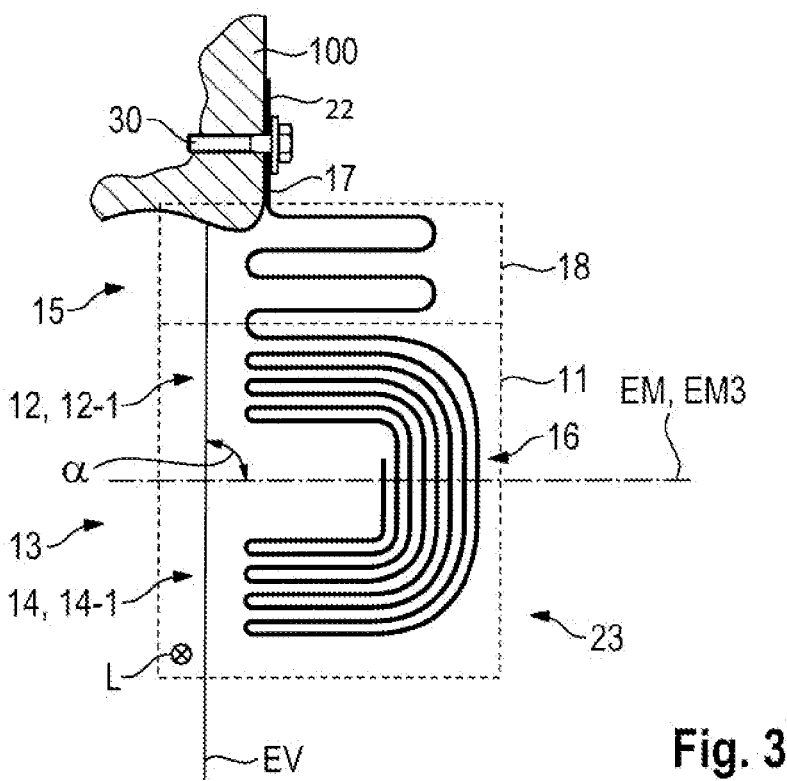
FIG. 3 shows a cross-sectional view of the airbag module shown in FIG. 1 in a second configuration variant.

The representation of FIG. 3 substantially corresponds to FIG. 2, but it shows an airbag 10 the C-shaped configuration 11 of which is formed of a zigzag folded portion. Also, a combination of rolled folding and zigzag folding is imaginable. In one exemplary arrangement, the C-shaped configuration 11 comprises at least three or more (as shown in FIG. 3) or more folded layers. One folded layer includes a panel of the airbag blank laid forth and back (i.e. two layers of two superimposed or one-piece woven fabric panels).

In all described exemplary embodiments, the outer shape of the C-shaped configuration 11 may be designed to be circular, oval, semicircular, rectangular, square-shaped in its cross-section or may be adapted in any other shape to the space conditions of the vehicle body 100.

To this end, before or during impressing the rolled-up ("rolled-folded") and/or zigzag folded portion of the airbag blank, the latter is pressed into an appropriate form having a desired outer contour. The shaping may be different along the longitudinal extension of the airbag 10 so that the airbag 10 can be adapted to the different space conditions at the respective positions of the car body 100. In the airbag module 1 according to the arrangement depicted in FIGS. 2 and 3, according to one exemplary configuration, the airbag 10 includes a further portion 18 in addition to the C-shaped configuration 11.

Said further portion 18 may equally be rolled ("rolled-folded") and/or zigzag folded. In one exemplary configuration, the further portion 18 comprises at least two (as shown in FIGS. 2 and 3), or more, folding layers. For example, the arrangement in FIG. 3 may include three or four folding layers. One folding layer in this context consists of an airbag layer laid forth and back (i.e. two layers of two superimposed or one-piece woven fabric panels).

The further portion 18 may be arranged adjacent to at least one of the juxtaposed legs 12, 14 and/or to the portion 16 of the airbag 10 connecting said legs. The further portion 18 may directly join either of the juxtaposed legs 12, 14 or the portion 16 connecting said legs and/or an upper edge 17 of the airbag 10 at which the afore-mentioned securing units 30 of the airbag module 1 are arranged. Also, the (and/or a second) further portion may be formed below, i.e. distant from the upper edge 17, at the C-shaped configuration 11 and thus may comprise a lower edge of the airbag 10.

Figure 4A:
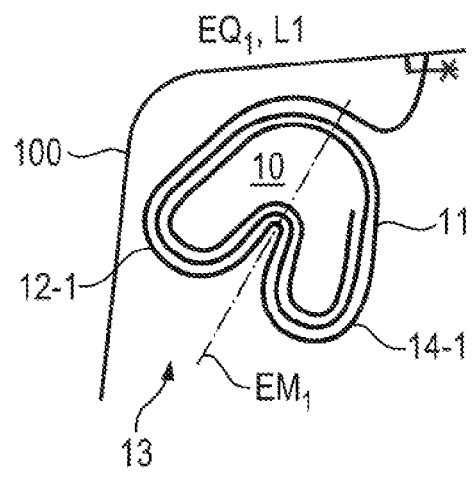
FIGS. 4a-c show cross-sectional views of the airbag module shown in FIG. 1 through different longitudinal portions along its longitudinal extension.
Figure 4B:
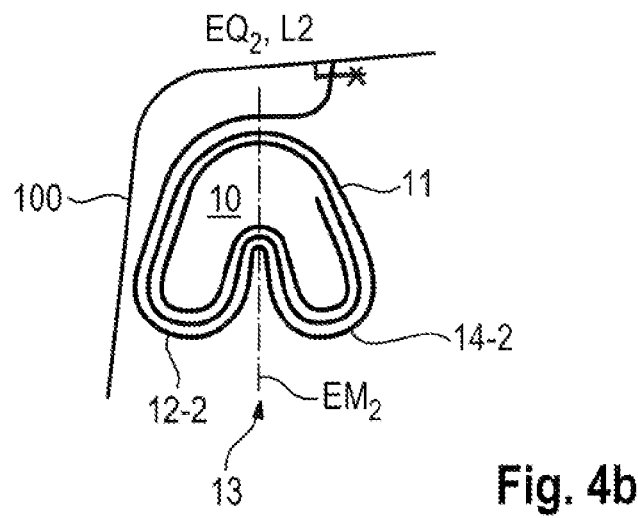
Figure 4C:
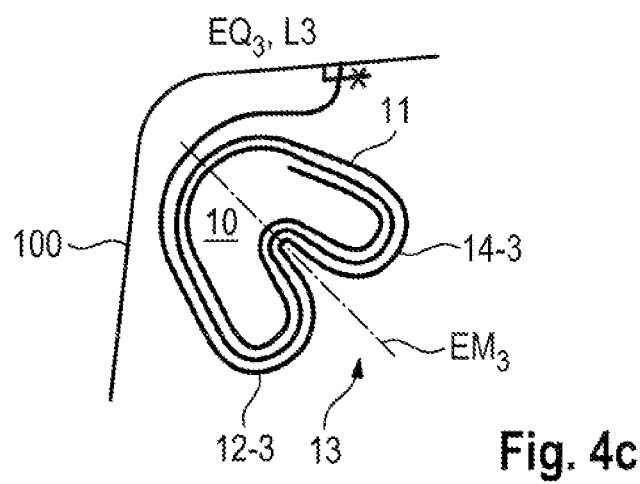
Figure 5A:
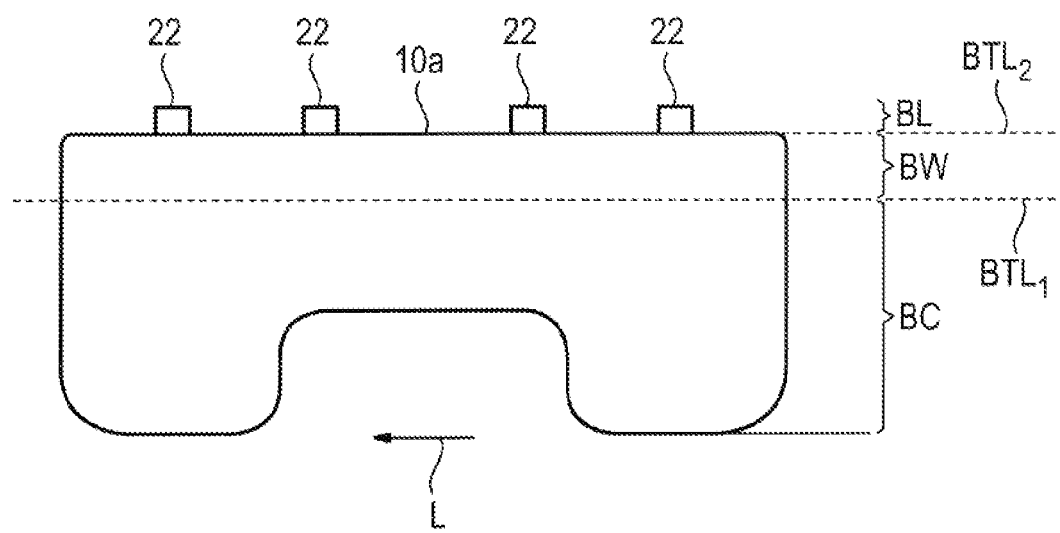

As is illustrated in FIG. 1, the airbag module 1 may include an airbag 10 having a plurality of longitudinal portions L1, L2, L3. In each of said longitudinal portions, a (parallel) corresponding cross-sectional plane EQ1, EQ2, EQ3 is defined. According to one exemplary arrangement, a first central plane EM1 defined by the legs 12-1, 14-1 juxtaposed in a first cross-sectional plane EQ1 intersects or crosses a second central plane EM2 defined by the legs 12-2, 14-2 juxtaposed in a second cross-sectional plane EQ2. For the purpose of better comprehension, in FIGS. 4a-c views of the respective cross-sectional planes EQ1, EQ2, EQ3 (plane of projection) across the airbag 10 and especially across its C-shaped configuration are shown. The respective central planes EQ1, EQ2, EQ3 extend normal to the plane of projection and consequently are shown as lines positioned between the respective legs 12-i, 14-i of the cross-sectioned airbag 10. It is evident that the directions of the respective central planes (and thus the orientation of the open side 13i of the C-shaped configurations 11i) are individually orientated in the individual longitudinal portions Li. When the three FIGS. 4a-c are put on top of each other, the mutual crossing of the planes EM1-3 is clearly visible. In the shown example, this results in the following deployment behaviors of the respective portions Li of the airbag 10:

In the arrangement shown in FIG. 4a, the open side 13 points diagonally downwards to the outside, thus resulting in rather outwardly directed deployment of the airbag 10. In the arrangement shown in FIG. 4b, the open side 13 points vertically downwards, which results in (normal) downward deployment of the airbag 10. In the arrangement shown in FIG. 4c, the open side 13 points diagonally downwards to the inside, which results in rather inwardly direction deployment of the airbag 10.

Of course, along the longitudinal extension L of the airbag also fewer or more than three longitudinal portions Li may be provided. It is equally possible to design the respective orientation of the open side 13 of the C-shaped configuration 11 to be equal in different longitudinal portions Li, Lj (adjacent or spaced apart from each other). Further, FIG. 1 illustrates that the airbag 10 includes along its longitudinal extension L a plurality of securing straps 22 for receiving securing units 30, especially securing clips or screws for attaching the airbag module 1 to a vehicle. In a defined mounting situation of the airbag 10, the orientation of the securing straps 22 is substantially in parallel to a vertical plane EV of the vehicle (shown in FIGS. 2, 3).

Depending on the design of the airbag 10, the securing straps 22 may extend from the first leg 12, from the second leg 14, from the connecting portion 16 or from the further portion 18.

In order to maintain the airbag 10 which is completely folded and connected to the inflator 20 to form the airbag module in its configuration provided for mounting to the vehicle, along its longitudinal extension L a plurality of especially strip-shaped retaining elements 19 spaced apart from each other and annularly surrounding the airbag 10 are provided. Some of them are schematically shown in FIG. 1. Even though a mounting tube was alternatively imaginable, however, the attachment of separate retaining elements, e.g. (adhesive) strips provided with predetermined breaking points, offers the advantage of individually and permanently maintaining the individual differently folded areas of the airbag 10 in their form.

With reference to the FIGS. 5a-e, hereinafter the manufacture of an airbag module 1 according to the disclosure shall be illustrated:

At first, a sewn airbag cutting or a one-piece woven (OPW) airbag is flatly provided as "airbag blank 10a". It is divided into at least one first area portion BC (e.g. defined below an area separating line BTL) and into at least one second area portion BW (defined e.g. above the area separating line BTL1).

In another step depicted in FIG. 5b, the first (e.g. lower) area portion BC of the airbag blank 10a is rolled and/or folded transversely to its longitudinal extension L to form an elongate package.

In another step depicted in FIG. 5c, lateral edges 12', 14' of the package are moved toward each other at least in portions. This may be effectuated e.g. by a rod 220, a bar, a plate or an E-shaped tool. Accordingly, in one exemplary arrangement, the area BC may be pressed into a (U-shaped) receiving element 200 so that in its area portion BC the airbag 10 has a C-shaped design 11 including two juxtaposed legs 12, 14 in an imaginary cross-sectional plane EQ transversely to its longitudinal extension L, as is shown in FIG. 5d.

In another step depicted in FIG. 5e, the second (e.g. central) area portion BW of the airbag blank 10a is folded and/or rolled transversely to its longitudinal extension L to form an elongate package so that another (rolled- or zigzag-folded) portion 18 of the airbag 10 is formed.

The further portion 18 may be arranged, as shown in FIG. 5e, above the C-shaped configuration 11; but it may also be provided beneath the C-shaped configuration 11.

In any case, in an area BL at the upper end of the airbag 10 (above a second area separating line BTL2) the securing straps 22 by which the airbag can be secured to the vehicle 100 are formed.

As a matter of course, the step of folding and forming the further portion 18 may also be carried out before the step of folding and forming the C-shaped configuration 11.

In another step, the airbag 10 is orientated relative to an inflator 20 of the airbag module 1, especially as already afore-described, and is coupled to the same in a gas-tight manner.

In another step, the airbag 10 is provided with a plurality of especially strip-shaped retaining elements 19 being spaced apart from each other and annularly surrounding the airbag 10 to maintain the completely folded airbag 10 in its configuration provided for mounting to the vehicle.

In another step, the securing elements 30 (shown in FIGS. 2 and 3, for example) for attaching the airbag module 1 to the vehicle 100 are orientated and are secured to the securing straps 22 of the airbag.

The afore-described steps of the exemplary method can be combined with each other depending on the optimum sequence of fabrication, wherein individual steps may be omitted as required.

The invention claimed is:

1. An airbag module comprising:
an inflatable airbag, wherein, when in a mounted configuration, the inflatable airbag comprises two juxtaposed legs defining a C-shaped configuration in an imaginary cross-sectional plane that extends transversely to a longitudinal extension of the inflatable airbag, and wherein a central plane defined between the two juxtaposed legs intersects a vertical plane extending through the longitudinal extension of the inflatable airbag,
an inflator for inflating the inflatable airbag,
a plurality of securing units for attaching the airbag module to a vehicle,
another portion comprising a first end and a second end, wherein the first end is connected to at least one of the securing units of the plurality of securing units and the second end is connected to at least one of the two juxtaposed legs, wherein the another portion is arranged in a rolled configuration between the first end and the second end;
wherein the inflatable airbag comprises a first longitudinal portion, a second longitudinal portion, and a third longitudinal portion, wherein an open side of the C-shaped configuration of the first longitudinal portion is oriented towards a first direction, an open side of the C-shaped configuration of the second longitudinal portion is oriented towards a second direction, the second direction different from the first direction, and an open side of the C-shaped configuration of the third longitudinal portion is oriented towards a third direction, the third direction different from the second direction and different from the first direction.

2. The airbag module of claim 1, wherein the inflatable airbag includes a plurality of cross-sectional planes arranged in parallel to each other along its longitudinal extension, wherein a first central plane defined by the legs juxtaposed in a first of the plurality of the cross-sectional planes intersects a second central plane defined by the legs juxtaposed in a second of the plurality of cross-sectional planes.

3. The airbag module of claim 1, wherein the inflatable airbag is rolled and/or zigzag folded along its longitudinal extension within its C-shaped configuration.

4. The airbag module of claim 1, wherein the inflatable airbag includes a plurality of securing straps along its longitudinal extension for receiving the securing units for attaching the airbag module to the vehicle, wherein, when in the mounted configuration of the inflatable airbag, the securing straps are arranged substantially in parallel to the vertical plane.

5. The airbag of claim 1, wherein the inflatable airbag includes a plurality of strip-shaped retaining elements along its longitudinal extension that are spaced apart from each other and annularly surrounding the inflatable airbag, wherein the retaining elements are designed to maintain the airbag in the mounted configuration.

6. The airbag module of claim 1, wherein along its longitudinal extension, the inflatable airbag includes a plurality of securing straps for receiving the securing units for attaching the airbag module to the vehicle, wherein the securing straps extend from the another portion.

7. The airbag module of claim 1, wherein along its longitudinal extension, the inflatable airbag includes a plurality of securing straps for receiving the securing units for attaching the airbag module to the vehicle, wherein the securing straps extend from one of the two juxtaposed legs.

8. The airbag module of claim 1, wherein along its longitudinal extension, the inflatable airbag includes a plurality of securing straps for receiving the securing units for attaching the airbag module to the vehicle, wherein the securing straps extend from a connecting portion that connects the juxtaposed legs.

9. A method of manufacturing an airbag module, comprising, rolling and/or folding an inflatable airbag transversely to its longitudinal extension to form an elongate package in which lateral edges of the elongate package are moved toward each other and are fixed so that the inflatable airbag has a C-shaped configuration to form two juxtaposed legs in an imaginary cross-sectional plane transverse to the longitudinal extension of the inflatable airbag, the inflatable airbag comprising a first longitudinal portion, a second longitudinal portion, and a third longitudinal portion, and orientating the inflatable airbag relative to an inflator of the airbag module such that a central plane defined between the two juxtaposed legs intersects a vertical plane extending through the longitudinal extension of the airbag when the inflatable airbag is in a mounted configuration, wherein an open side of the C-shaped configuration of the first longitudinal portion is oriented towards a first direction, an open side of the C-shaped configuration of the second longitudinal portion is oriented towards a second direction, the second direction different from the first direction, and an open side of the C-shaped configuration of the third longitudinal portion is oriented towards a third direction, the third direction different from the second direction and different from the first direction.

10. The method of claim 9, wherein, along the longitudinal extension, the inflatable airbag forms a plurality of cross-sectional planes parallel to each other, and wherein a first central plane defined by the legs juxtaposed in a first cross-sectional plane of the plurality of cross-sectional planes intersects a second central plane defined by the legs juxtaposed in a second cross-sectional plane of the plurality of cross-sectional planes.

11. The method of claim 9, further comprising, rolling and/or zigzag folding another portion of the inflatable airbag separately from the C-shaped configuration, arranging the another portion adjacent to at least one of the juxtaposed legs and/or a connecting portion of the C-shaped configuration that connects said legs together.

12. An airbag module comprising:
an inflatable airbag comprising a first longitudinal portion, a second longitudinal portion, and a third longitudinal portion;
a plurality of securing units for attaching the first longitudinal portion, the second longitudinal portion, and the third longitudinal portion to a vehicle,
wherein the inflatable airbag includes two juxtaposed legs that form a C-shaped configuration when arranged in a mounted configuration within the vehicle, the two juxtaposed legs connected together by a connecting portion,
wherein an open side of the C-shaped configuration of the first longitudinal portion is oriented towards a first direction, an open side of the C-shaped configuration of the second longitudinal portion is oriented towards a second direction, the second direction different from the first direction, and an open side of the C-shaped configuration of the third longitudinal portion is oriented towards a third direction, the third direction different from the second direction and different from the first direction.

13. The airbag module of claim 12, further comprising:
another portion disposed between at least one of the securing units of the plurality of securing units and at least one of the juxtaposed legs, wherein the another portion is further disposed within a plane, the another portion arranged in a rolled configuration and comprising at least two folded layers when the inflatable airbag is arranged in the mounted configuration.

* * * * *